US011059528B2

(12) United States Patent
Nakamura

(10) Patent No.: US 11,059,528 B2
(45) Date of Patent: Jul. 13, 2021

(54) AIR RESISTANCE REDUCTION DEVICE FOR VEHICLE

(71) Applicant: HONDA MOTOR CO., LTD., Tokyo (JP)

(72) Inventor: Shinsuke Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 42 days.

(21) Appl. No.: 16/486,252

(22) PCT Filed: Nov. 20, 2017

(86) PCT No.: PCT/JP2017/041616
§ 371 (c)(1),
(2) Date: Aug. 15, 2019

(87) PCT Pub. No.: WO2018/150667
PCT Pub. Date: Aug. 23, 2018

(65) Prior Publication Data
US 2020/0239087 A1 Jul. 30, 2020

(30) Foreign Application Priority Data
Feb. 17, 2017 (JP) .............................. JP2017-028178

(51) Int. Cl.
B62D 35/02 (2006.01)
(52) U.S. Cl.
CPC ..................... B62D 35/02 (2013.01)
(58) Field of Classification Search
CPC ....................................................... B62D 35/02
USPC ...................................................... 296/180.1
See application file for complete search history.

(56) References Cited

U.S. PATENT DOCUMENTS

| 2013/0026797 | A1* | 1/2013 | Onodera | B62D 35/02 296/204 |
| 2015/0225026 | A1 | 8/2015 | Ohira et al. | |
| 2017/0101137 | A1 | 4/2017 | Tesch et al. | |
| 2017/0144636 | A1 | 5/2017 | Schmidt et al. | |
| 2017/0291649 | A1* | 10/2017 | Zuhlsdorf | B60T 5/00 |

FOREIGN PATENT DOCUMENTS

| DE | 102011120427 A1 | 7/2012 | |
| DE | 102014118800 A1 * | 6/2016 | B60K 11/04 |
| JP | 2015-150913 A | 8/2015 | |

(Continued)

OTHER PUBLICATIONS

International Search Report by ISA/JP dated Jan. 16, 2018, on PCT/JP2017/041616, 1 page.

(Continued)

Primary Examiner — Joseph D. Pape
(74) Attorney, Agent, or Firm — Rankin, Hill & Clark LLP

(57) ABSTRACT

A first strake and a second strake, which are provided in front of a front wheel when viewed from in front of a vehicle, and a passage defined by the first strake and the second strake. The passage is open to a space in front of the vehicle, and the second strake located close to a lateral surface among the first strake and the second strake extends rearward in a front-rear direction of the vehicle from a front end of the second strake and further extends rearward curving to a rear end of the second strake that is closer to a vehicle lateral side than the front end.

4 Claims, 9 Drawing Sheets

(56) References Cited

FOREIGN PATENT DOCUMENTS

| WO | 2016008935 A1 | 1/2016 |
|----|---------------|--------|
| WO | 2016020520 A1 | 2/2016 |

OTHER PUBLICATIONS

Written Opinion by ISA/JP dated Jan. 16, 2018, on PCT/JP2017/041616, 4 pages.
Office Action received in corresponding CN application No. 201780086855.2 dated Apr. 1, 2021 with English translation (12 pages).

* cited by examiner

FIG. 11
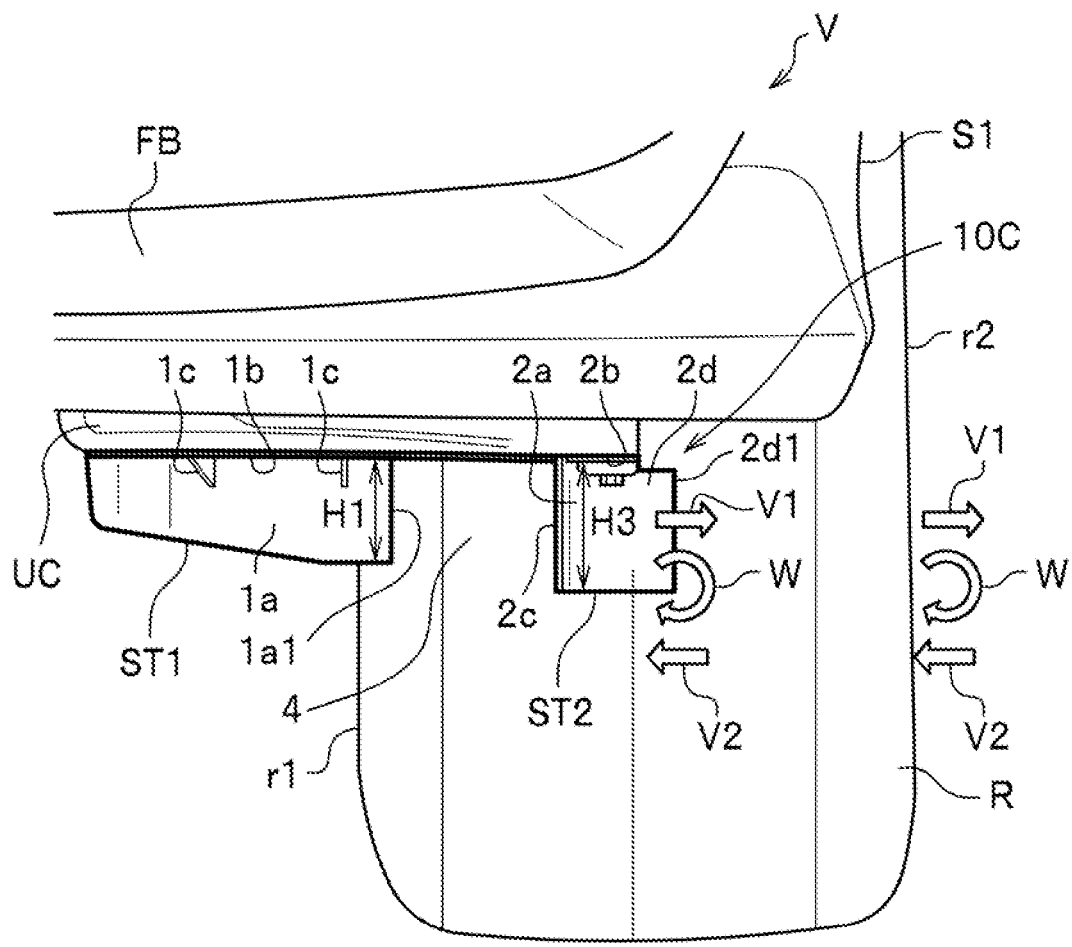
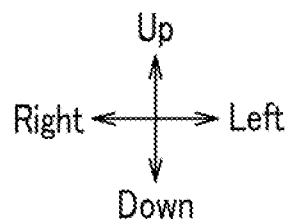

AIR RESISTANCE REDUCTION DEVICE FOR VEHICLE

TECHNICAL FIELD

The present invention relates to an air resistance reduction device for a vehicle.

BACKGROUND ART

Patent Literature 1 proposed a device to reduce air resistance to a vehicle which includes, in the front of the vehicle, an undercover (50), an air dam (40) attached to a front bumper (30), and a deflector (60) disposed between the air dam and a front wheelhouse (6). Such a device includes a pocket section in front of the wheel house. The pocket section is defined by a front of the undercover that closes an opening under a vehicle bottom in the front of the vehicle, the air dam located on vehicle front and outer sides of the pocket section, and the deflector located on a back side of the pocket section. The pocket section has a sector shape having an inner side, in the vehicle width direction, which is open, when viewed from under the vehicle. The pocket section smooths the airflow coming from in front of the vehicle while making it difficult for the airflow to go over the rear of the deflector. This produces a relatively negative pressure area behind the deflector, thus reducing air resistance to the vehicle in moving motion.

CITATION LIST

Patent Literature

Patent Literature 1: JP2015150913A

SUMMARY OF INVENTION

Technical Problem

However, according to the device described in Patent Literature 1, the airflow coming from in front of the vehicle collides with the air dam and increases the air resistance. Patent Literature 1 does not consider the force with which the airflow coming from in front of the vehicle is deflected to lateral sides of the vehicle.

The present invention is to solve the aforementioned conventional problem, and an objective thereof is to provide an air resistance reduction device for a vehicle which is capable of reducing air resistance due to the airflow coming from in front of the vehicle.

Solution to Problem

An air resistance reduction device for a vehicle according to the present invention includes: a plurality of strakes including a first strake and a second strake which are provided in front of a front wheel when viewed from in front of the vehicle; and a passage defined by the plurality of strakes, in which the passage is open to a space in front of vehicle, and is the second strake located close to a vehicle lateral side extends rearward in a vehicle front-rear direction from a front end of the second strake and further extends rearward curving to a rear end of the second strake that is closer to the vehicle lateral side than the front end.

Advantageous Effects of Invention

According to the present invention, it is possible to provide an air resistance reduction device for a vehicle which is capable of reducing air resistance due to the airflow coming from in front of the vehicle.

BRIEF DESCRIPTION OF DRAWINGS

FIG. 11 is a front view illustrating an air resistance reduction device for a vehicle of a third embodiment.

DESCRIPTION OF EMBODIMENTS

Hereinafter, embodiments of the present invention will be described with reference to the accompanying drawings.

First Embodiment

Figure 1:
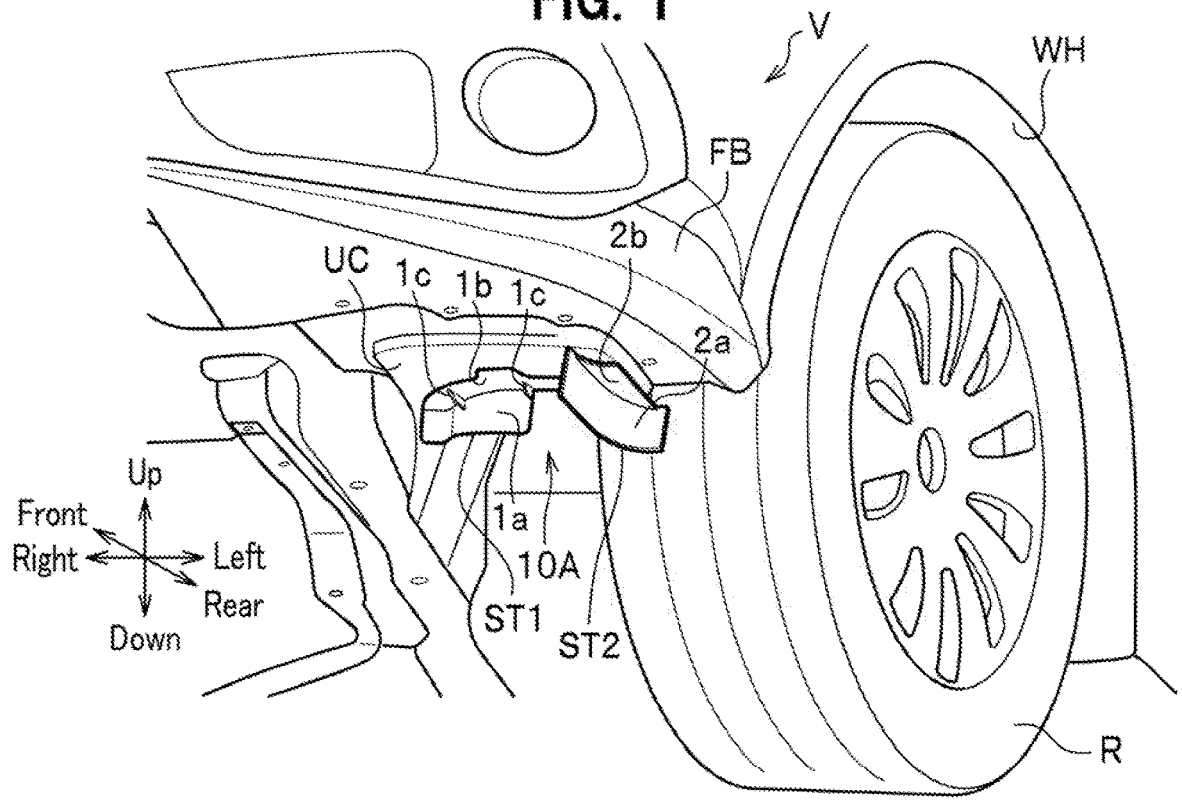
FIG. 1 is a perspective view illustrating an air resistance reduction device for a vehicle of a first embodiment.

FIG. 1 is a perspective view illustrating an air resistance reduction device for a vehicle of a first embodiment. Front, rear, right, left, up, and down directions of a vehicle V are shown by arrows in FIG. 1. FIG. 1 illustrates a left front part of the vehicle V.

As illustrated in FIG. 1, an air resistance reduction device 10A for a vehicle of the first embodiment reduces the air resistance due to the airflow coming from in front of the vehicle V and is provided in front of a left front wheel R (a wheelhouse WH). The same air resistance reduction device is provided for the right front wheel symmetrically (not illustrated).

The air resistance reduction device 10A includes: a first strake ST1, which extends substantially in a right-left direction (in a vehicle width direction); and a second strake ST2, which extends substantially in a front-rear direction. The first strake ST1 is located inwardly from the strake ST2 in the vehicle width direction. The first and second strakes ST1 and ST2 are fixed to an undercover UC of the vehicle V. To the undercover UC, a part of a front bumper FB is fixed.

The first strake ST1 is one of the plurality of strakes (the first strake ST1 and the second strake ST2) and is located close to the center of the vehicle V (close to the vehicle center) i. The first strake ST1 includes a plate member (a protrusion, a wall) 1a, which projects from the undercover UC downward in the vertical direction (in a up-down direction) and extends in a width direction (in a right-left direction). The first strake ST1 further includes a plate-shaped fixing section 1b, which extends from the upper edge of the plate member 1a at a right angle. The fixing section 1b is fixed to the undercover UC with a plurality of bolts, for example. At an inner corner (the front corner) defined by the plate member 1a and fixing section 1b, ribs 1c and 1c are defined, which prevent the first strake ST1 from deforming and inclining rearward due to the airflow coming from in front of the vehicle. The number of ribs 1c is not limited to that of the first embodiment and can be properly changed.

The second strake ST2 is one of the plurality of strakes (the first strake ST1 and the second strake 2) and is located close to a lateral side of the vehicle V (on the vehicle lateral side). The second strake ST2 includes a plate member 2a (a protrusion, a wall) which projects from the undercover UC downward in the vertical direction (in the up-down direction) and is elongated substantially in the front-rear direction. The second strake ST2 also includes a plate-shaped fixing section 2b, which extends from the upper edge of the plate member 2a at a right angle. The fixing section 2b is fixed to the undercover UC with a bolt, for example.

Figure 2:
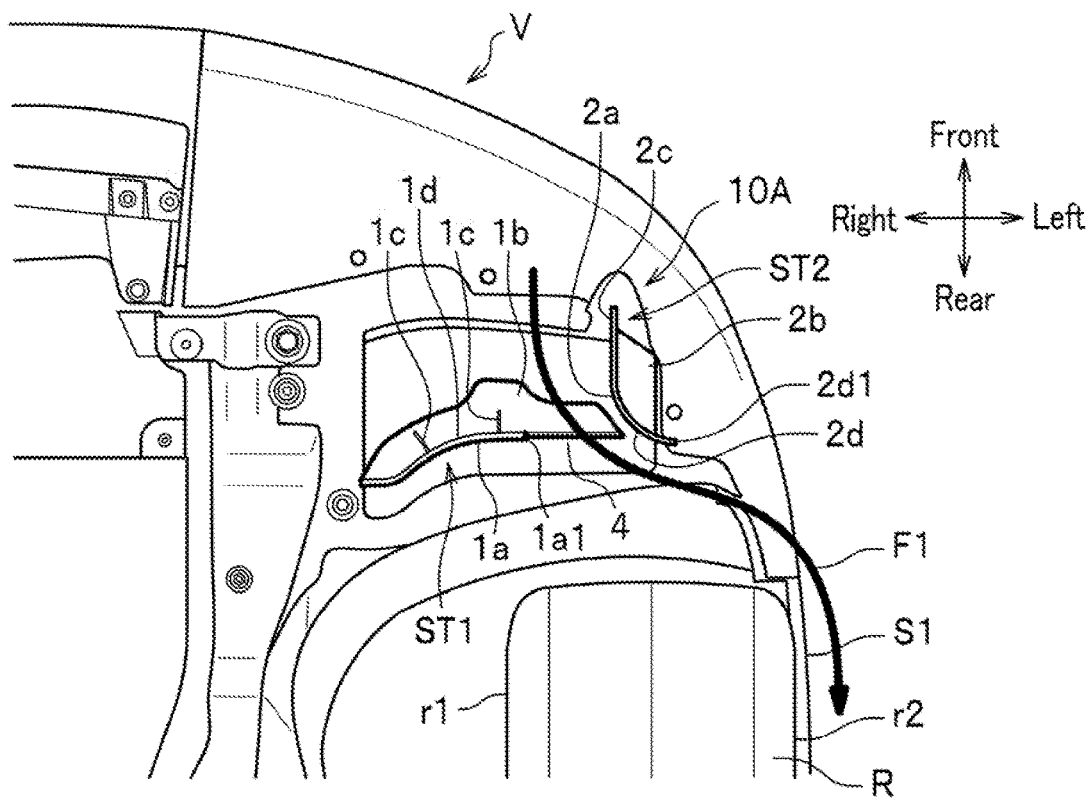
FIG. 2 is a plan view of the air resistance reduction device for a vehicle of the first embodiment when viewed from under the vehicle.

FIG. 2 is a plan view of the air resistance reduction device for a vehicle of the first embodiment when viewed from under the vehicle.

As illustrated in FIG. 2, the plate member 1a of the first strake ST1 includes a curved surface 1d, which curves rearward from left (from the outside in the width direction) to right (toward the center in the width direction) and is slightly convex forward. When the airflow coming from in front of the vehicle V collides with the plate member 1a, therefore, a part of the airflow smoothly flows toward the center of the vehicle V in the vehicle width direction, leading to lower increase in resistance.

Figure 3:
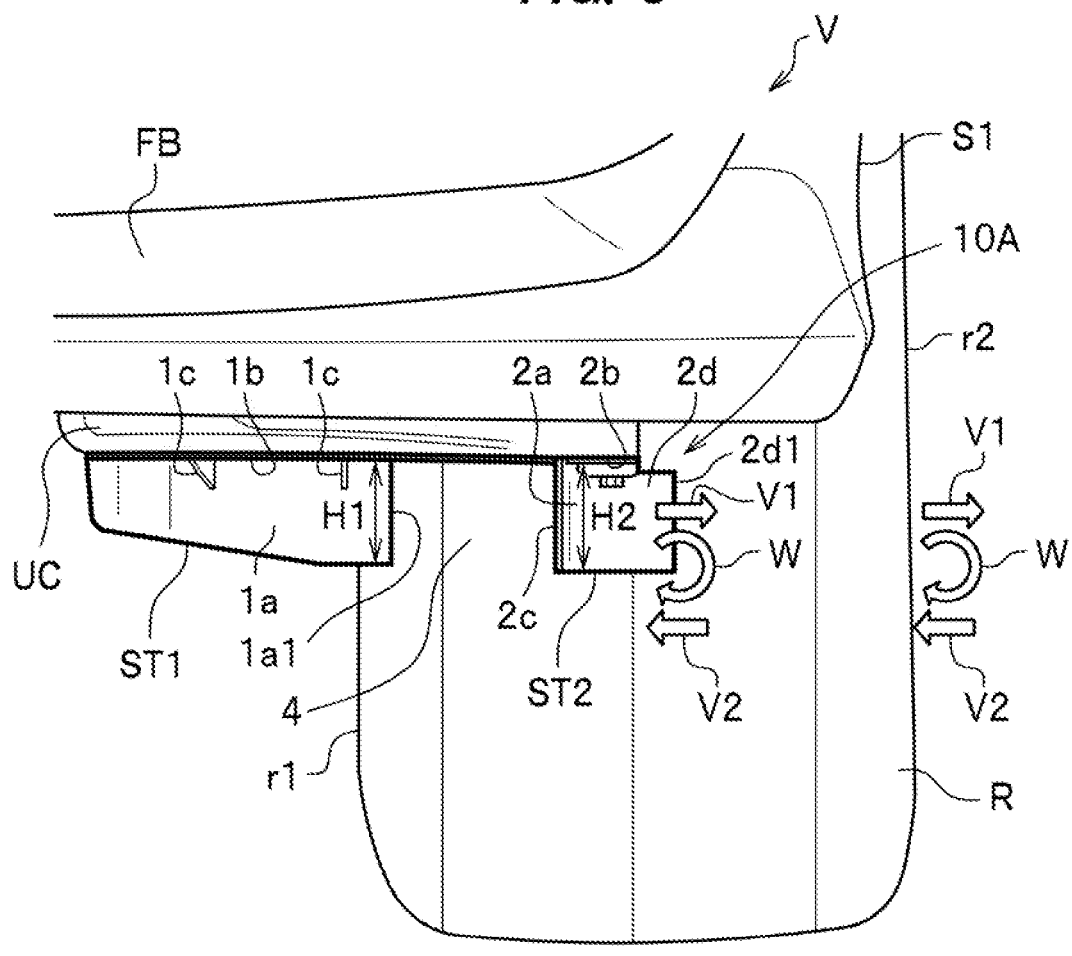
FIG. 3 is a front view of the air resistance reduction device for a vehicle of the first embodiment.

The outer (left) end portion of the first strake ST1 in the vehicle width direction is located to be substantially aligned with an inner side surface r1 of the front wheel (vehicle wheel) R in the front view (see FIG. 3). The substantially entire front region of the front wheel R is thereby located outwardly from the first strake ST1 in the width direction (on a lateral surface S1 side of the vehicle V). This allows optimizing the flow rate of an airflow. If the outer end portion of the first strake ST1 in the vehicle width direction is excessively short (the inner side surface r1 is located outside the outer end portion), the amount of the airflow that goes to the wheelhouse WH increases. If the outer end portion of the first strake ST1 in the vehicle width direction is excessively long, the amount of the airflow that passes through a passage 4 becomes small.

The plate member 2a of the second strake ST2 is located outwardly (close to the lateral surface S1 of the vehicle V) from the first strake ST1 in the vehicle width direction and includes a flat section 2c and a curved section 2d. The flat section 2c extends linearly in the front-rear direction. The curved section 2d curves outward (toward the lateral surface of the vehicle V) from the rear end portion of the flat section 2c in the vehicle front-rear direction. The second strake ST2 thus extends in the vehicle front-rear direction and curves away from a vehicle center line toward the vehicle lateral side. The second strake ST2 is substantially aligned with the center, in the vehicle width direction, of the front wheel R. The second strake ST2 is located in front of the first strake ST1. The positions of an end portion 2d1 of the second strake ST2 and an end portion 1a1 of the first strake ST1 substantially coincide with each other in the front-rear direction.

Between the first strake ST1 and the second strake ST2, the passage (air passage) 4 that provides a passage for the airflow (air) coming from in front of the vehicle V is defined. The passage 4 is open to a space forward from the vehicle (to a space in front of the vehicle V) (see FIGS. 1 and 2). The first strake ST1 is located close to the center in the vehicle width direction, not the inner side surface r1 of the front wheel R. The second strake ST2 is substantially aligned with the center, in the vehicle width direction, of the front wheel R. This allows the passage 4 to be wide.

The airflow (air) coming from in front of the vehicle V goes rearward along the flat section 2c of the second strake ST2 as shown with a thick solid arrow F1 in FIG. 2. The airflow then curves toward the outside (toward the lateral surface S1) of the vehicle V along the curved section 2d of the second strake ST2 while passing through the passage 4 rearward. Herein, the air passing through the passage 4 flows along the curved section 2d of the second strake ST2 due to the Coanda effect. In such a manner, air in front of the vehicle that will collide with the front wheel R is deflected to the lateral surface S1 of the vehicle V, thus reducing the air resistance (driving resistance) due to the airflow.

By providing the passage 4, the velocity of the air passing between the first and second strakes ST1 and ST2 increases, and air flows along the flat section (a linear section in a plan view) 2c. Since the curved section 2d continuously extends from the flat section 2c, the Coanda effect allows air to flow along the curved section 2d to the outer side surface r2 of the front wheel R.

FIG. 3 is a front view illustrating the air resistance reduction device for a vehicle according to the first embodiment.

As illustrated in FIG. 3, the passage 4 defined between the first strake ST1 and the second strakes ST2 has a recessed shape (a gate shape) when viewed from in front of the vehicle V. The passage 4 is located to have the entire width thereof overlap the front wheel R in the front-rear direction. A lower end portion (a front end portion), fixed to the undercover UC and extending downwardly, of the first strake ST1 is formed to have the lower end portion taper as it extends inwardly in the vehicle width direction (toward the center) from the end portion 1a1 of the plate member 1a, when viewed from in front of the vehicle V. This reduces the resistance due to the airflow coming from in front of the vehicle.

A height H1 of the end portion 1a1 of the first strake ST1 (a height from the bottom side of the vehicle V (from the undercover UC)) and a height H2 of the second strake ST2 (a height from the bottom side of the vehicle V (from the undercover UC)) are substantially equal. The present invention is not limited to the configuration according to which the heights of the first strake ST1 and the second strake ST2 are substantially equal.

As shown by the arrow F1 (see FIG. 2), the air having flowed along the curved section 2d of the second strake ST2 in such a manner then flows from the end portion 2d1 of the second strake ST2 outward in the vehicle width direction (leftward, to the lateral surface S1). The thus-created outward (outside) airflow produces a negative pressure under the end portion 2d1, thus generating an inward (rightward) airflow. In such a manner, production of an outward airflow and an inward airflow at the end portion 2d1 causes a difference in pressure. To reduce the difference in pressure, a vortex W occurs. The occurrence of the vortex W produces close to the end portion 2d1, an airflow represented by a vector V1 over the vortex W and produces an airflow represented by a vector V2 under the vortex W. The vortex W moves from the end portion 2d1 to the outer side surface r2 of the front wheel R. On the outer side surface r2 of the front wheel R, an outward airflow represented by the vector V1 similar to the aforementioned airflow is produced over the vortex W while an inward airflow represented by the vector V2 similar to the aforementioned airflow is produced under the vortex W.

Such a vortex W allows the air flowing out to the lateral surface S1 of the vehicle V (shown by the arrow F1) to flow rearward along the lateral surface S1 of the vehicle V without significantly separating from the lateral surface S1 as illustrated in FIG. 2.

Figure 6:
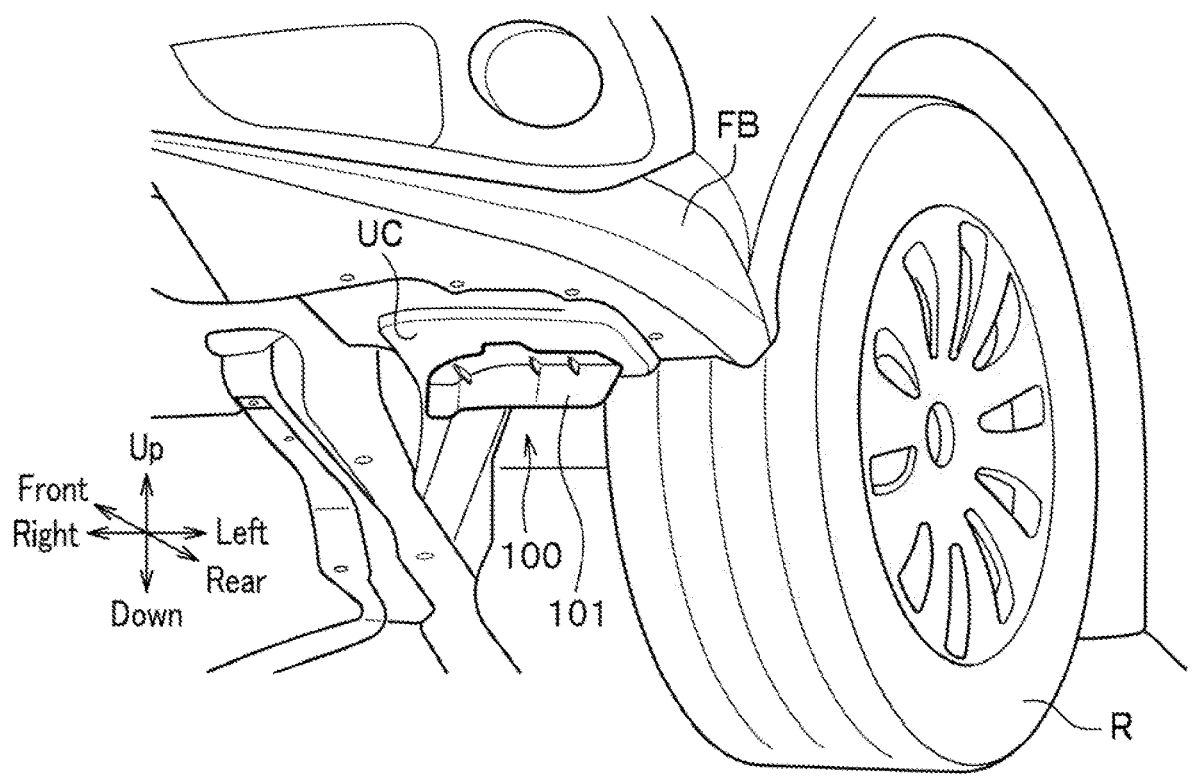
FIG. 6 is a perspective view illustrating an air resistance reduction device for a vehicle as Comparative Example.
Figure 7:
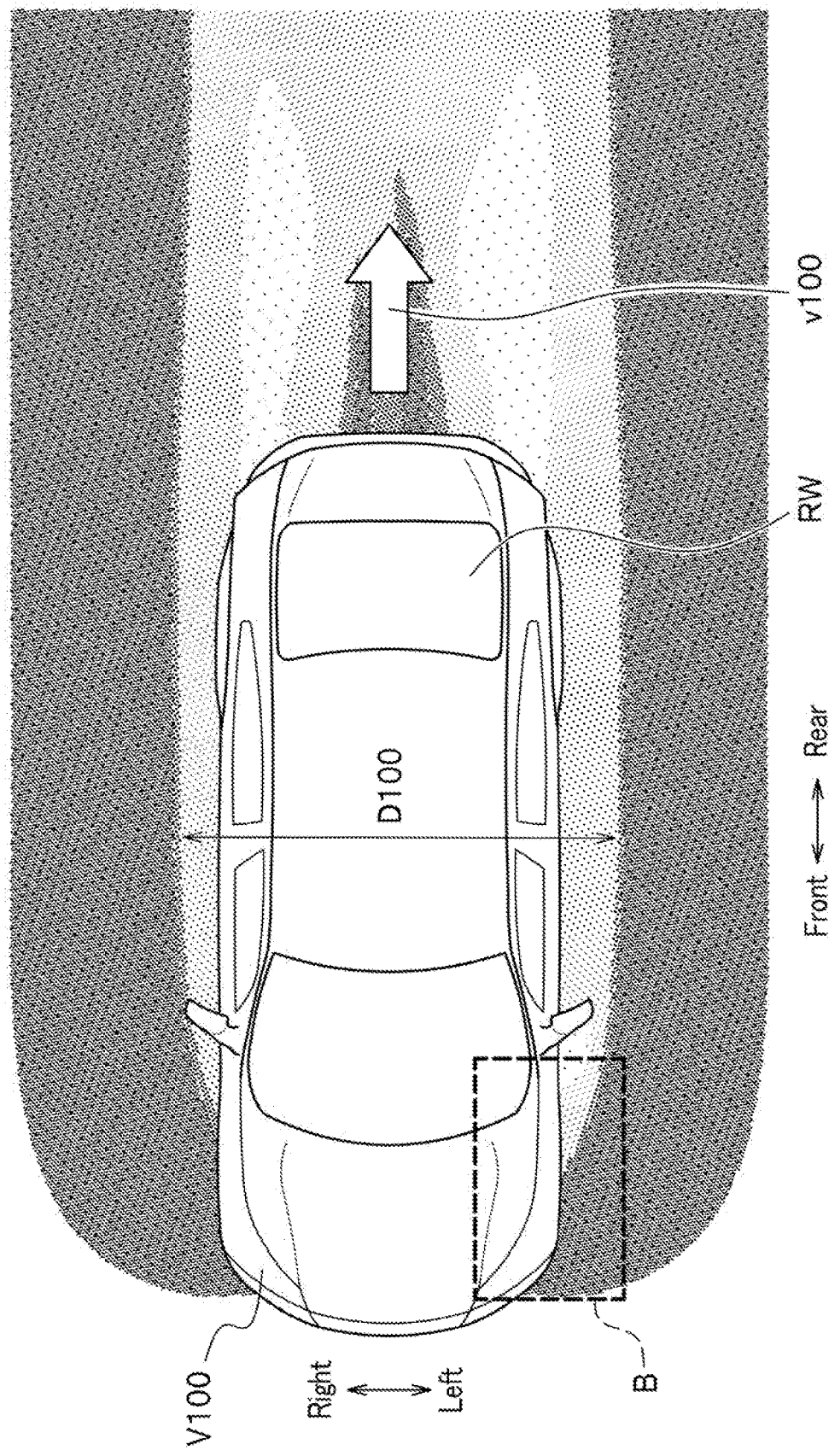
FIG. 7 is a velocity distribution diagram example of the air flowing around the vehicle provided with the air resistance reduction device for a vehicle of Comparative Example.
Figure 8:
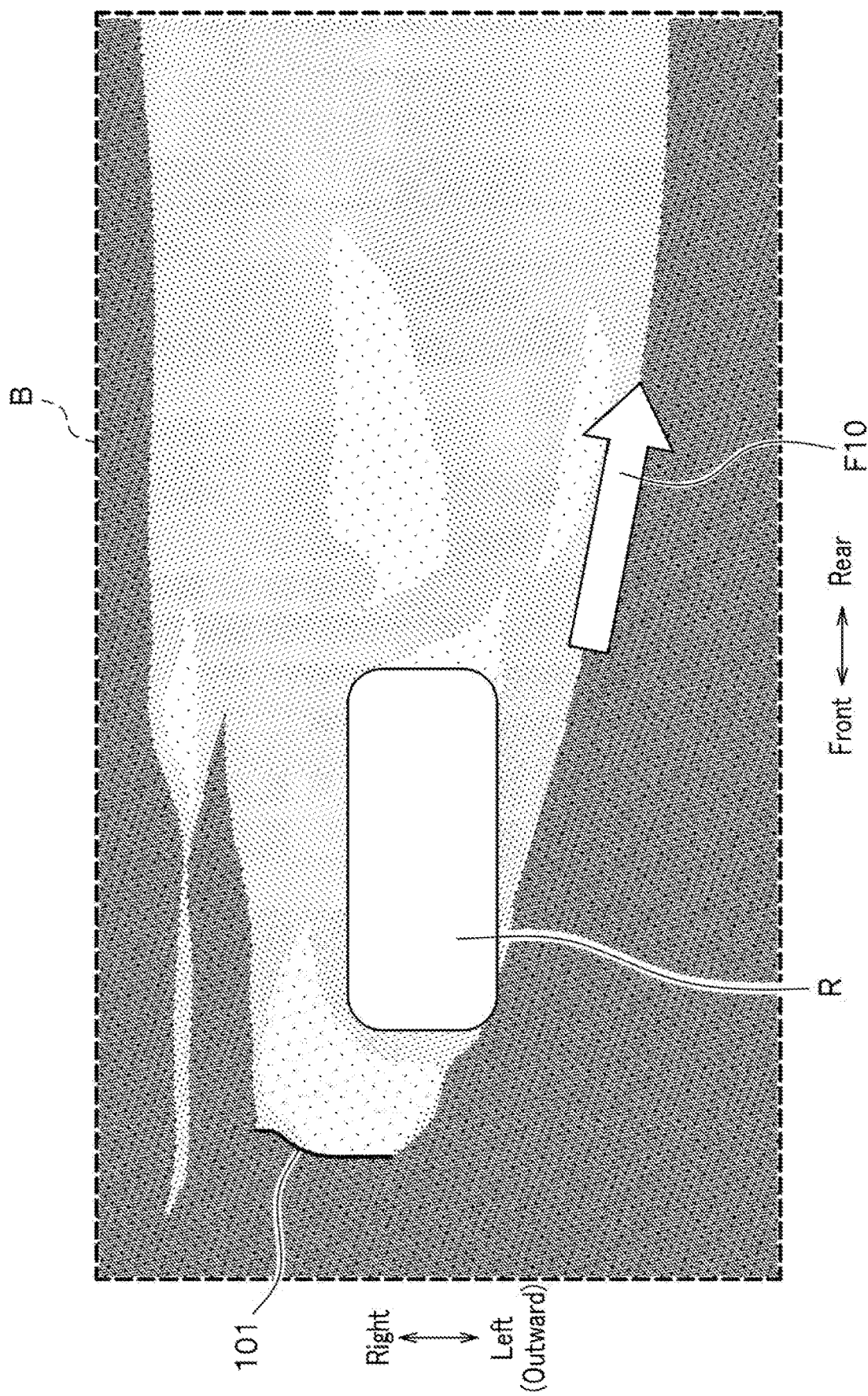
FIG. 8 is a velocity distribution diagram in part B of FIG. 7.

An air resistance reduction device not including the second strake ST2 will be described as Comparative Example with reference to FIGS. 6 to 8. FIG. 6 is a perspective view of the air resistance reduction device for a vehicle as Comparative Example. FIG. 7 is a velocity distribution diagram example of the air flowing around a vehicle provided with the air resistance reduction device for a vehicle as Comparative Example. FIG. 8 is a velocity distribution diagram of part B of FIG. 7. In FIGS. 7 and 8, differences in a velocity of air are represented by dot densities. Areas with the highest dot density represent areas in which the velocity is the fastest while areas with the lowest dot density represent areas in which the velocity is the slowest. The velocity is represented by four levels from areas with the highest dot density to areas with the lowest dot density.

As shown in FIG. 6, an air-resistance reduction device 100 as Comparative Example includes a strake 101. The strake 101 is longer than the strake ST1 of the first embodiment in the vehicle width direction. Specifically, the strake 101 is extended from the end portion 1a1 (see FIG. 2) of the plate member 1a of the first embodiment toward the lateral surface S1 of the vehicle. The strake 101 is configured without considering the passage 4 of the first embodiment.

The air resistance reduction device 100 including the strake 101 produces an airflow having a velocity distribution illustrated in FIG. 8 around the front wheel R. In FIG. 8, a part shown by a thick solid line represents the strake 101. When an airflow comes from in front of the vehicle, the strake 101, which is located in front of the front wheel R, deflects the airflow to the side surface of the vehicle. According to Comparative Example, which does not include the second strake ST2 of the first embodiment, the vortex W (see FIG. 3) does not occur, and an airflow past the strake 101 forms outward (outside) flow, which then travels to the rear of the vehicle as shown by a white arrow F10.

As shown in FIG. 7, air with the highest velocity shown by the densest dots flows apart from the lateral surface S1 of the vehicle V. As shown by a white arrow v100, the velocity of the airflow flowing rearward under the floor of the vehicle V becomes slows from when flowing under a vehicle underfloor central part. As to the airflow passing over the top of the vehicle V and then going downward along a rear window RW, the degree of the vortices which are induced to be generated by the downward airflow and are present from the rear window RW to the rear of the vehicle becomes high since the velocity of the airflow slows from when flowing under the underfloor. In a case that the degree of vortices is high, the airflow flowing under the center of the vehicle V100 has negative pressure, thus increasing induced drag. According to Comparative Example, resistance (form drag) due to the wide strake 101 and the aforementioned induced drag are combined to increase the overall resistance.

Figure 4:
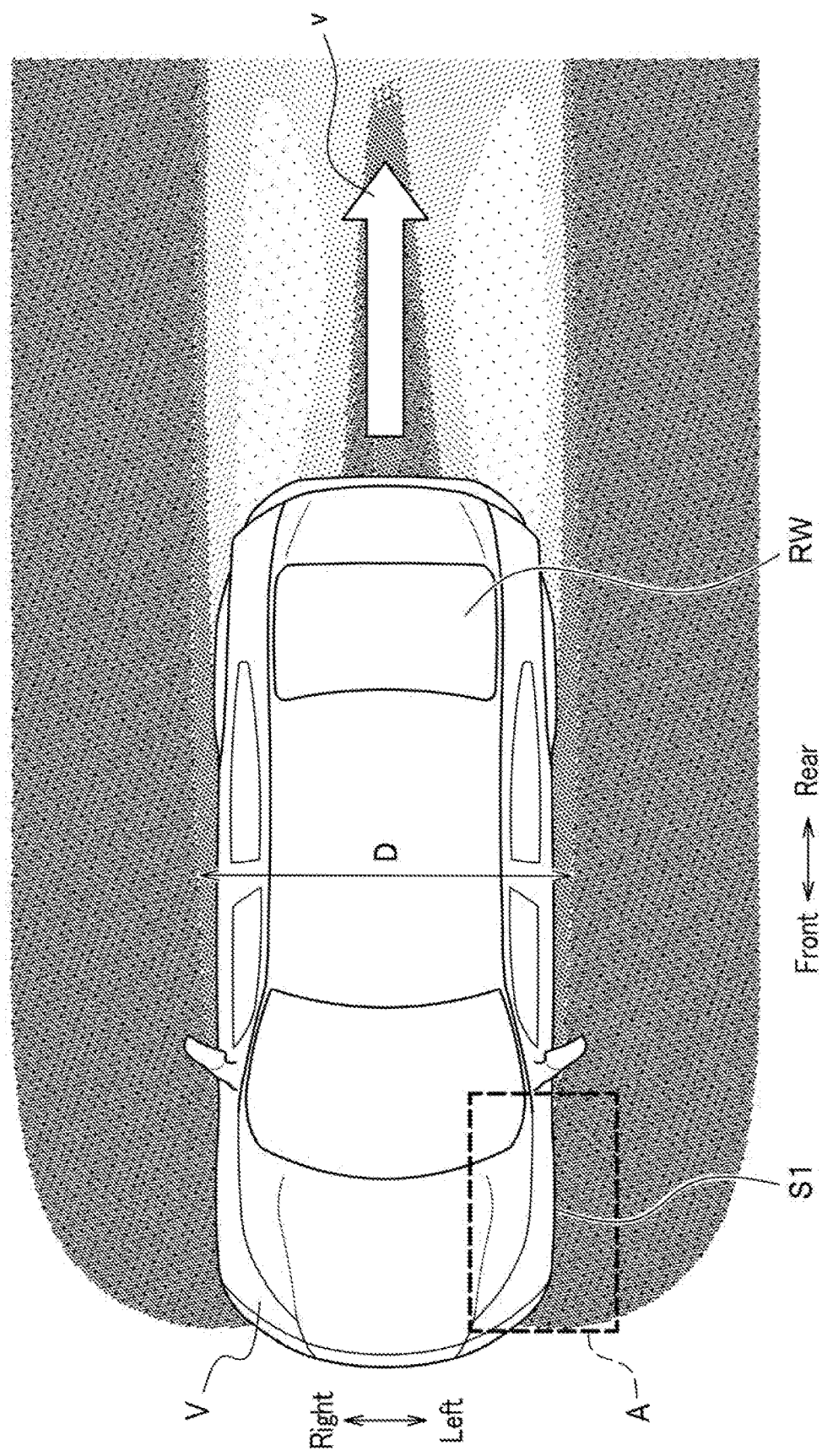
FIG. 4 is a velocity distribution diagram example of the air flowing around the vehicle provided with the air resistance reduction device for a vehicle of the first embodiment.
Figure 5:
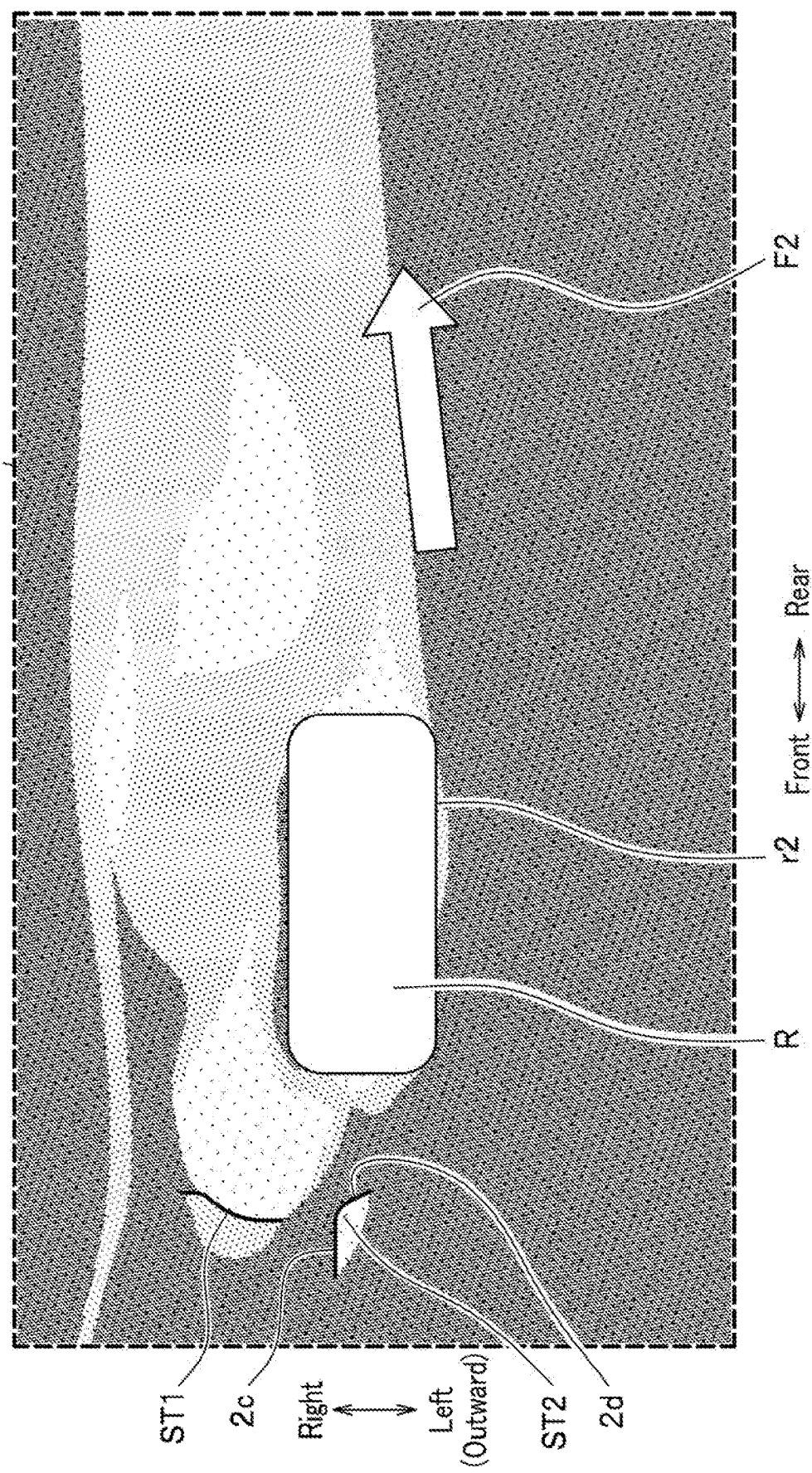
FIG. 5 is a velocity distribution diagram in part A of FIG. 4.

The air resistance reduction device 10A of the first embodiment is to reduce air resistance due to the combination of the first strake ST1 and the second strake ST2. The operation and effect of the first embodiment will be described with reference to FIGS. 4 and 5. FIG. 4 is a velocity distribution diagram example of the air flowing around the vehicle provided with the air resistance reduction device for a vehicle of the first embodiment. FIG. 5 is a velocity partial diagram of part A of FIG. 4. In FIGS. 4 and 5, differences in velocity of air are represented by dot densities in the same way as FIGS. 7 and 8.

As shown in FIG. 5, according to the first embodiment, provision of the first strake ST1 and the second strake ST2 produces the airflow flowing through the passage 4 (see FIG. 3) along the curved section 2d of the second strake ST2. This generates the vortex W (see FIG. 3), and the airflow goes rearward with flowing along the outer side surface r2 of the front wheel R. Behind the front wheel R, an inward airflow with respect to the vehicle V occurs as shown by a white arrow F2.

The occurrence of such inward flow (the arrow F2) allows the fastest flow (main flow) to flow along the lateral surface S1 of the vehicle V as shown in FIG. 4, thus narrowing pressure loss width D (region). When the pressure loss width D is narrowed in such a manner, the rearward flow speeds up from when flowing under the underfloor center part as shown by a white arrow v. The airflow having passed over the top of the vehicle V and flowed downward along the rear window RW collides with (entrains) the flow flowing out of the underfloor. This weakens the vortices generated an present from the rear window RW to the rear of the vehicle V and thereby reduces induced drag. The first strake ST1 is made shorter than that of Comparative Example as described above. This reduces the resistance (form drag). In addition, the second strake S2 produces outward flow in front of the front wheel R. This reduces the resistance due to the airflow that collides with the front wheel R. Furthermore, provision of the second strake ST2 reduces the induced drag, allowing for reduction in overall driving resistance to a running airflow.

As described above, the first embodiment includes, when viewed from in front of the vehicle V: the first strake ST1 and the second strake ST2 provided in front of the front wheel R; and the passage 4 defined by the first strake ST1 and the second strake ST2. The passage 4 is open to a space in front of the vehicle V, and the flat section 2c of the second strake ST2, which is located close to the lateral surface S1, among the first strake ST1 and the second strake ST2, extends in the front-rear direction of the vehicle V and the curved section 2d curves away from the center of the vehicle V toward the lateral surface S1 of the vehicle V. This allows for reduction in resistance due to reduction in the width of the first strake ST1, reduction in resistance due to the function of the second strake ST2 deflecting an airflow to the lateral surface S1 in front of the front wheel R, and reduction in resistance due to provision of the second strake ST2, resulting in reduction in driving resistance of the vehicle V as a whole.

According to the first embodiment, the first strake ST1 and the second strake ST2 are configured as separate units, that is, configured to move separately. This facilitates adjustment of the air resistance reduction device 10A. The air resistance reduction device 10A can be adjusted by moving only the second strake ST2 with the first strake ST1 fixed, for example.

Second Embodiment

Figure 9:
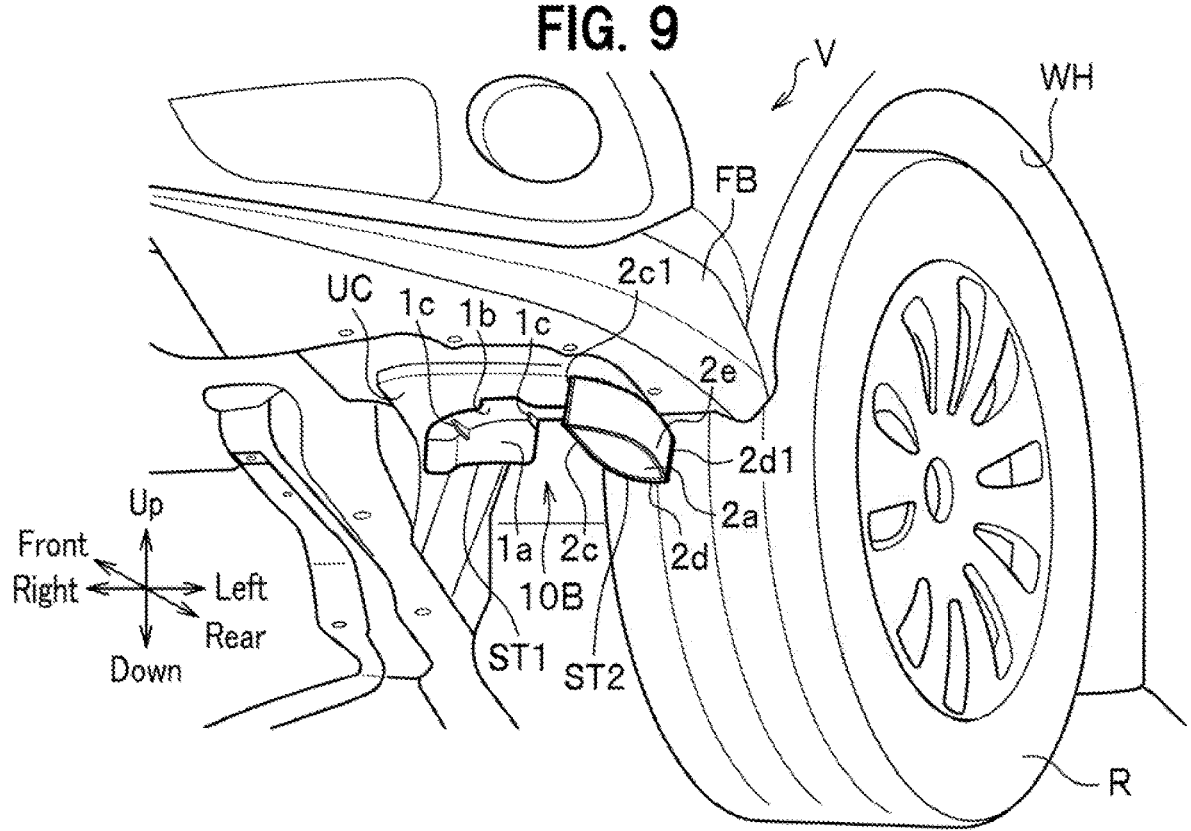
FIG. 9 is a perspective view illustrating an air resistance reduction device for a vehicle of a second embodiment.
Figure 10:
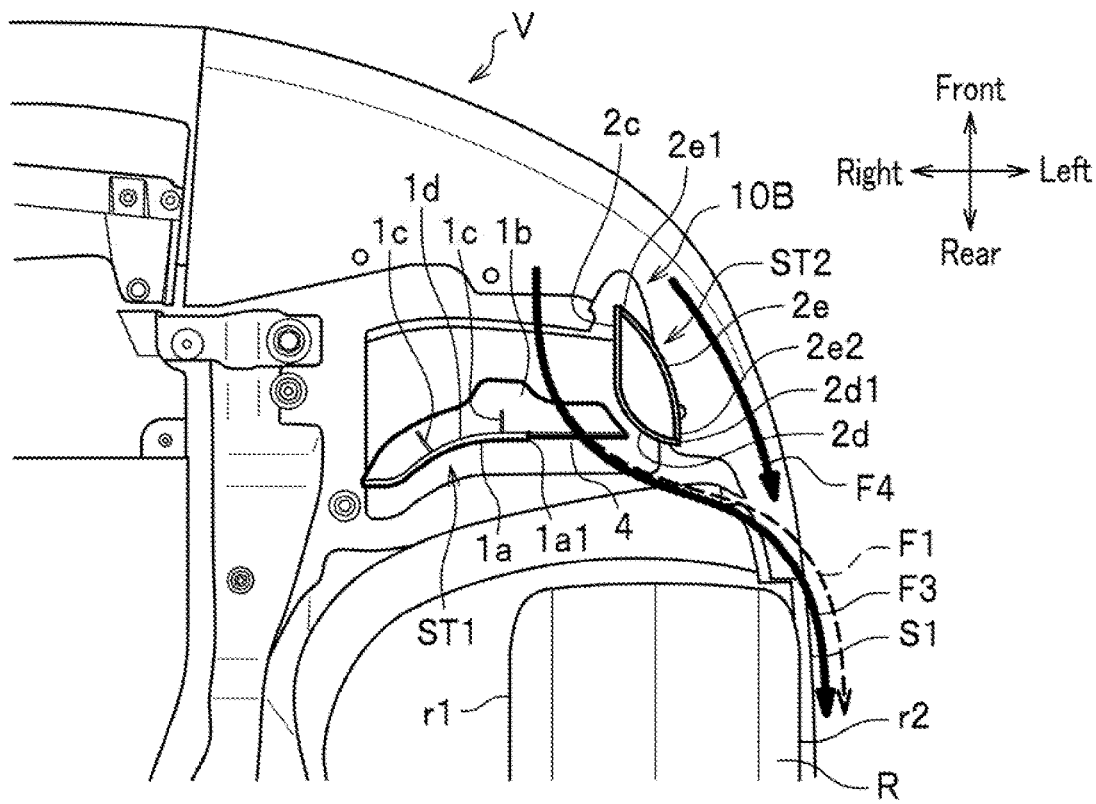
FIG. 10 is a plan view of the air resistance reduction device for a vehicle of the second embodiment when viewed from underneath the vehicle.

FIG. 9 is a perspective view illustrating an air resistance reduction device for a vehicle of the second embodiment. FIG. 10 is a plan view of the air resistance reduction device for a vehicle of the second embodiment when viewed from under the vehicle. According to the second embodiment, the same configurations as those of the first embodiment are given the same reference numerals, and duplicate descriptions will be omitted.

As illustrated in FIG. 9, an air resistance reduction device 10B for a vehicle of the second embodiment further includes a cover member 2e added to the second strake ST2 of the first embodiment. The cover member 2e is composed of a plate member that covers the outer side surface of the strake ST2 of the first embodiment and extends from a front end 2c1 of the flat section 2c to the end portion 2d1 of the curved section 2d. The cover member 2e extends downwardly and its height from the undercover UC is substantially equal to that of the flat section 2c and curved section 2d.

As shown in FIG. 10, a front end portion 2e1 of the cover member 2e is inclined toward the lateral surface S1 with respect to the flat section 2c. A rear end portion 2e2 of the cover member 2e is orthogonal to a direction of the end portion 2d1 of the curved section 2d. The cover member 2e curves so as to be convex outward.

According to the second embodiment, adding the cover member 2e to the second strake ST2 prevents separation of the air flowing along the outer surface of the second strake ST2. Specifically, the cover member 2e prevents separation of an airflow as shown by a solid arrow F4. The airflow shown by the arrow F4 joins the airflow having passed along the curved section 2d. This facilitates flowing of the airflow along the outer side surface r2 of the front wheel R as shown by a solid arrow F3.

Third Embodiment

FIG. 11 is a front view illustrating an air resistance reduction device for a vehicle of a third embodiment.

As shown in FIG. 11, an air resistance reduction device 10C for a vehicle of the third embodiment is different from that of the first embodiment due to a difference in the shape of the second strake ST2 between the first embodiment and the third embodiment. The shape of the first strake ST1 is the same as that of the first embodiment.

A height H3 of the second strake ST2 (a height from the bottom side of the vehicle V (from the undercover UC)) is greater than the height H1 of the first strake ST1 (the height from the bottom side of the vehicle V (from the undercover UC)).

According to the third embodiment, a generated vortex W extends downward as a result of extending the second strake ST2 downward. This increases a force that draws the airflow generated by the front wheel R stepping on an airflow, to the outer side surface r2 of the front wheel R. This results in reduction in air resistance.

Hereinabove, the embodiments are described. The present invention is not limited to the above-described embodiments and can be applied to various modes. The first strake ST1 and the second strake ST2 are configured as separate bodies but may be integrated as a single unit for example.

According to the above-described embodiment, the downward extending amount (downward extending length) of the first strake ST1 and the second strakes ST2 under the undercover UC are substantially equal. However, the height H2 of the second strake ST2 from the vehicle bottom side may be greater than the height H1 of the first strake ST1 from the vehicle bottom side. The thus-increased area of the curved section of the second strake ST2 enhances the Coanda effect, thus increasing the flow rate of the air deflected to the lateral surface S1 of the vehicle V.

According to the aforementioned embodiments, the end portion 2d1 of the curved surface 2d faces outward in the vehicle width direction. However, the present invention is not limited to such a direction. The second strake ST2 may be further provided with a second curved section that curves rearward from the end portion 2d1 of the curved section 2d. Thus, the airflow deflected to the lateral surface S1 of the vehicle V by the curved section 2d can easily flow along the lateral surface S1 of the vehicle V.

4 Passage
1a Plate member
1b Fixing section
2a Plate member
2b Fixing section
2c Flat section
2c1 Front end
2d Curved section
2d1 End portion
2e Cover member
ST1 First strake
ST2 Second strake
10A, 10B Air resistance reduction device
H1 Height of the first strake from a vehicle bottom side
H2, H3 Height of the second strake from the vehicle bottom side
r1 Inner side surface
R Front wheel
S1 Lateral surface
V Vehicle

The invention claimed is:

1. An air resistance reduction device for a vehicle comprising:
   a plurality of strakes, including a first strake and a second strake, which are provided in front of a front wheel when viewed from in front of the vehicle; and,
   a passage defined by the plurality of strakes;
   wherein the passage is open to a space in front of the vehicle;
   wherein the first strake comprises a first plate member projecting downward in a vehicle vertical direction;
   wherein the second strake located close to a vehicle lateral side comprises a second plate member projecting downward in the vehicle vertical direction;
   wherein the second plate member extends rearward in a vehicle front-rear direction from a front end of the second plate member and further extends rearward curving to a rear end of the second plate member that is closer to the vehicle lateral side than the front end;
   wherein the second plate member is located in front of the first plate member; and
   wherein the rear end of the second plate member and a front end of the first plate member substantially coincide with each other in the vehicle front-rear direction.

2. The air resistance reduction device for a vehicle according to claim 1:
   wherein the second strake is provided with a cover member located close to the vehicle lateral side.

3. The air resistance reduction device for a vehicle according to claim 1:
   wherein an outer end portion, in a vehicle width direction, of the first strake located close to a vehicle center line includes the front end of the first plate member and is positioned to be substantially aligned with an inner side surface of the front wheel.

4. An air resistance reduction device for a vehicle comprising:

a plurality of strakes, including a first strake and a second strake, which are provided in front of a front wheel when viewed from in front of the vehicle; and, a passage defined by the plurality of strakes;

wherein the passage is open to a space in front of the vehicle;

wherein the second strake located close to a vehicle lateral side extends rearward in a vehicle front-rear direction from a front end of the second strake and further extends rearward curving to a rear end of the second strake that is closer to the vehicle lateral side than the front end; and, wherein a height of the second strake from a vehicle bottom side is greater than a height of the first strake from the vehicle bottom side.

* * * * *